(No Model.)
F. A. MORSE.
AUTOMATIC LIQUID INDICATOR.
No. 588,650. Patented Aug. 24, 1897.
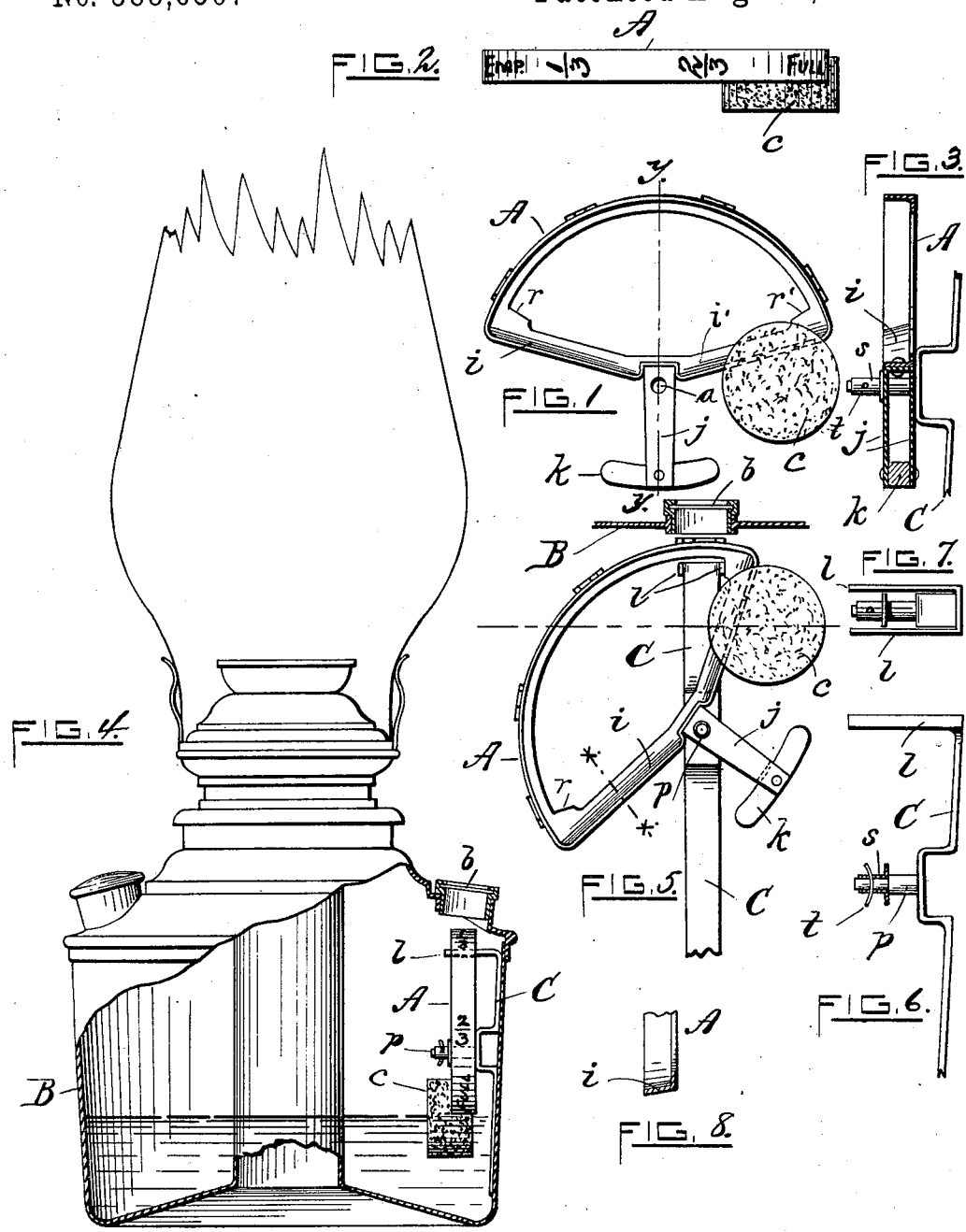
WITNESSES.
INVENTOR.
Frederic A. Morse
by James L. Jenks
Atty.

UNITED STATES PATENT OFFICE.

FREDERIC A. MORSE, OF PAWTUCKET, RHODE ISLAND.

AUTOMATIC LIQUID-INDICATOR.

SPECIFICATION forming part of Letters Patent No. 588,650, dated August 24, 1897.

Application filed December 11, 1896. Serial No. 615,322. (No model.)

*To all whom it may concern:*

Be it known that I, FREDERIC A. MORSE, a citizen of the United States, residing at Pawtucket, in the county of Providence and State of Rhode Island, have invented certain new and useful Improvements in Automatic Liquid-Indicators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in automatic liquid-indicators in which a portion of the rim of a wheel suitably mounted is provided with a float and has upon its convex surface characters for the purpose of revealing the height of liquid within the vessel in which said portion of a wheel is placed, and it constitutes an improvement upon my former patent issued by the United States Patent Office April 28, 1896, and numbered 559,061. My former invention for which said Letters Patent were granted was applicable only to vessels having a large opening—that is, an opening as large as the wheel itself which was to be introduced within the vessel. I have found it necessary, however, in order to adapt my invention to vessels with small openings to modify my former invention in such a manner as to provide an indicator that can be introduced into a comparatively small orifice, such as exists in many lamps now upon the market. I have also added certain other improvements to my original patent, which will be set forth hereinafter.

My present invention is fully shown in the drawings which accompany this specification, in which—

Figure 1 represents a side elevation of the indicator; Fig. 2, a top view of the same; Fig. 3, a vertical section through $y\ y$ of Fig. 1; Fig. 4, a lamp with a portion of the side cut away, showing my invention in place within the lamp; Fig. 5, my invention when the containing vessel is full, showing the float at its highest point and the eyepiece in close proximity to the rim; Fig. 6, a side view of the supporting-bracket upon which the indicator is mounted; Fig. 7, a top view of the same, and Fig. 8 a section through $x\ x$ of Fig. 5.

The same parts are referred to by the same letters throughout the several views.

In Fig. 1, A is a portion of the circumference of a wheel having the two spokes $i\ i'$ and the arm $j$, projecting downward from the center of the wheel, as shown, said arm $j$ being provided at its lower extremity with the counterweight $k$.

$c$ is a float, of cork or some other substance that will float easily upon any liquid, and is attached firmly to the spoke $i'$.

The rim A is marked at intervals with characters, as shown in Fig. 2, representing the degree of fullness of the vessel. In place of fractions of fullness figures representing quantity may be used, such as ounces, pints, &c.

The portion of the rim used may be supported by a single spoke connecting its center to the hub, but I have found it preferable to connect the ends of the portion of the rim by two spokes radiating from the hub, as shown in the drawings, as in this way greater rigidity and strength of structure are obtained.

The weight of $k$ is such that the wheel when left to itself will come to rest with the float $c$ at its lowest point.

The counterweight may be attached directly to the hub beneath the axis, and in its conformation it may be spherical or cylindrical, but I have found it preferable to attach the counterweight to a depending arm attached to the hub, as shown, and thus in removing the counterweight to a greater or less distance from the axis I have materially lightened the whole wheel structure. In attaching a counterweight also of the form shown in the accompanying drawings I have secured a greater uniformity of movement of the wheel-segment than is possible in any other form.

The device A, with its spokes $i\ i'$ and arm $j$ and counterweight $k$, is mounted upon a pivot, as shown in Fig. 3, and retained in place by a pin $t$ and thimble $s$. (Shown in Figs. 3 and 6.) As thus mounted, it revolves easily and by means of the float $c$ is caused to revolve in one direction by the rise of the surrounding liquid and in the other direction by the fall of the liquid. As it revolves the rim A is in close proximity to the transparent eyepiece $b$, as shown in Figs. 4 and 5. This eyepiece b is fixed in the upper portion of the containing vessel, and consists of a piece of plane glass, or it may be lenticular in form.

The supporting-bracket C, Fig. 6, is provided at its upper extremity with two projecting arms l, as seen also in Fig. 7. The purpose of these projections is to check the movement of A, so as to prevent the float going too far in either direction. It is not essential to my device that there should be two projecting arms l l, as shown, as a single arm will answer the purpose equally well.

My device operates as follows: The support C is fixed in approximately an upright position upon the interior of the containing vessel. The wheel is mounted upon the axis p and secured in place by the thimble s and pin t. The vessel being empty, or nearly empty, the wheel will take a position such that the float c is at the lowest point of the circumference, as shown in Fig. 4. As the oil or other liquid is now introduced into the containing vessel the float c will cause the revolution of the rim A in close proximity to the eyepiece b, thus enabling the degree of fullness of the vessel to be easily known and observed.

When the vessel is full, the float c is prevented from going too far by the projection r' upon the spoke i' striking the projecting arm l. As the vessel is emptied a reverse movement of the wheel takes place until it is completely empty, when the float is again prevented from going too far by the projection r striking the arm l.

The shape of the entire device, as shown in Figs. 1 and 5, is such that it can be introduced into an orifice which is little more than half as large as the diameter of the entire wheel would be, thus enabling me to use my device in many lamps of modern construction where my former invention would be useless.

Having now described my invention, what I claim, and desire to secure by Letters Patent, is—

1. An automatic liquid-indicator consisting of a portion of the rim of a wheel joined to a hub by a spoke or spokes, the convexity of said rim being marked with figures representing quantity; and provided with a float c and a counterweight k, joined to the hub by the arm j, substantially as described.

2. An automatic liquid-indicator consisting of a portion of the rim of a wheel joined to a hub by a spoke or spokes, the convexity of said rim being marked with characters of quantity; and provided with a float c and counterweight k fixed upon the end of an arm j, the whole mounted upon a support C having the stops l adapted to check the complete revolution of said rim in the manner described.

3. In an automatic liquid-indicator a portion of the rim of a wheel suitably mounted and provided with a float and counterweight and having its convexity marked with suitable characters, and provided with a stop or stops for preventing the complete revolution of said wheel; in combination with a containing vessel having fixed in the wall thereof, a transparent eyepiece in close proximity to the rim of said wheel, all substantially as set forth.

In testimony whereof I affix my signature in presence of two witnesses.

FREDERIC A. MORSE.

Witnesses:
LELLAN J. TUCK,
FRANK M. BORDEN.